Oct. 6, 1953 J. H. AMMON 2,654,351
FLUID SEPARATOR
Filed Feb. 1, 1949 3 Sheets-Sheet 1

INVENTOR
Johannes H. Ammon
BY
*M. Holbrook* ATTORNEY

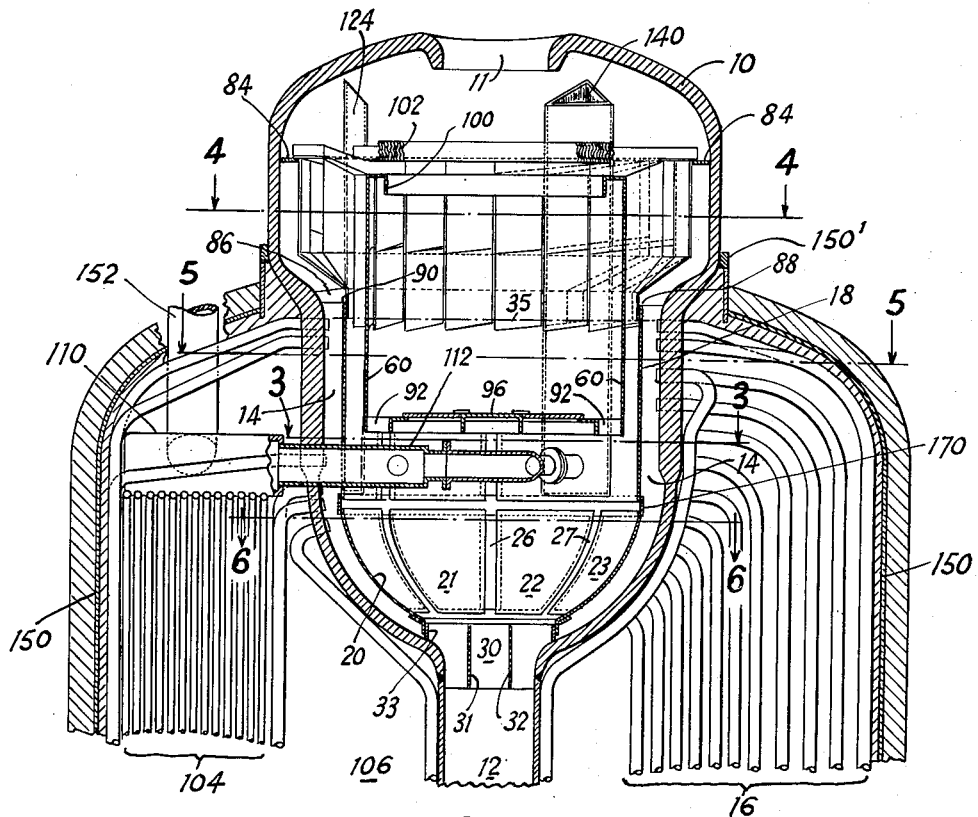
Fig. 2
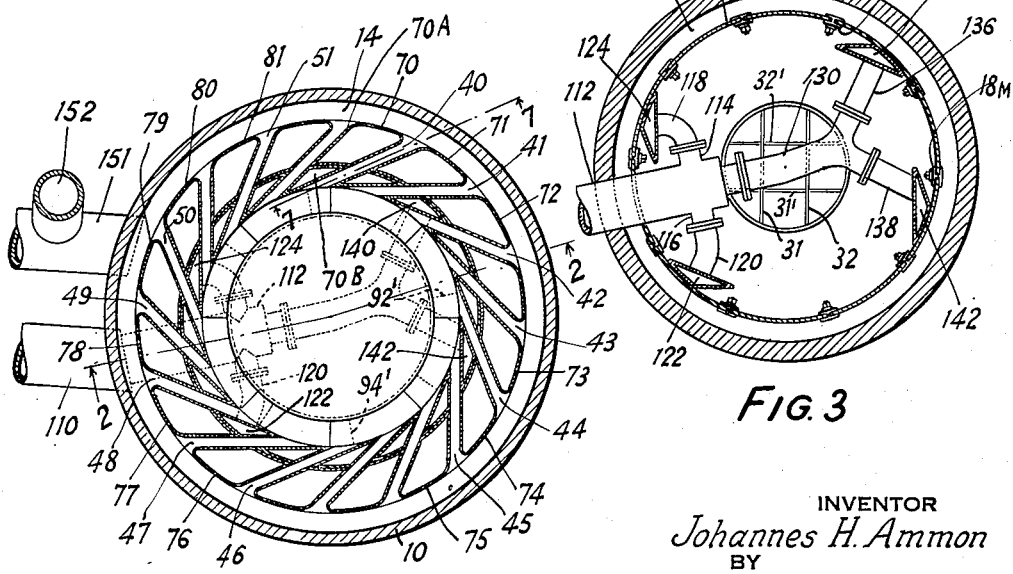
Fig. 3
Fig. 4
INVENTOR
Johannes H. Ammon
BY
R. H. Holbrook ATTORNEY

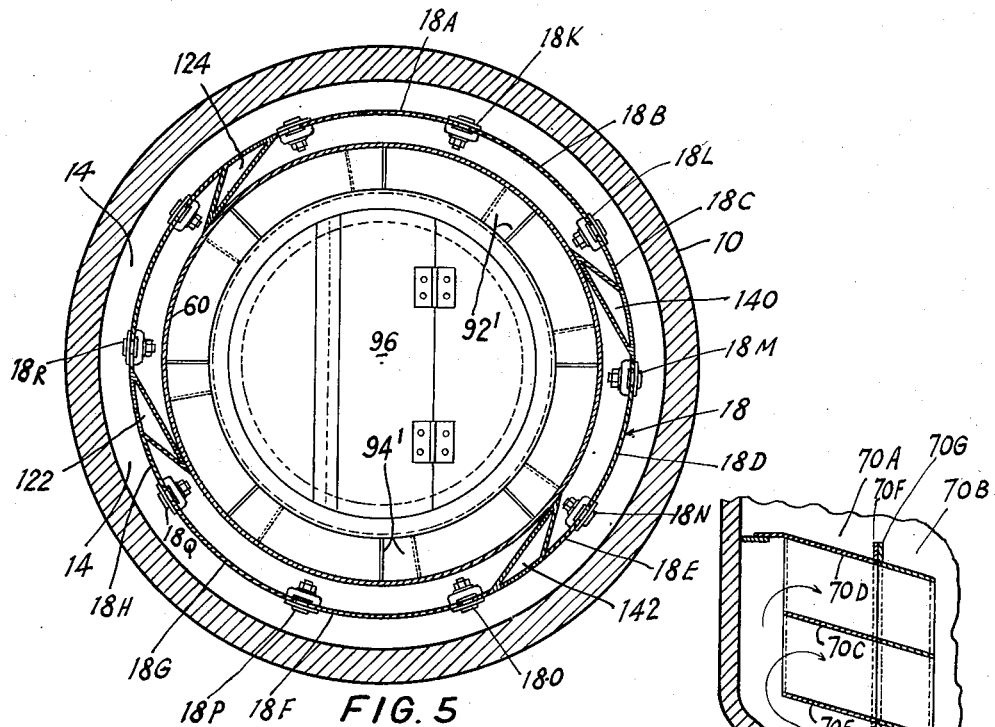
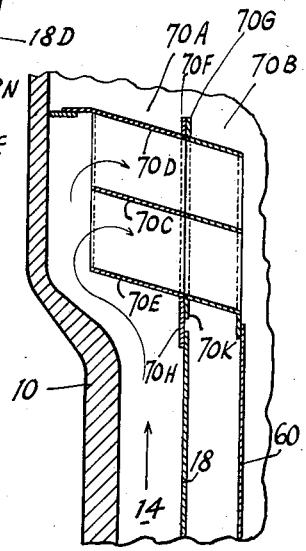
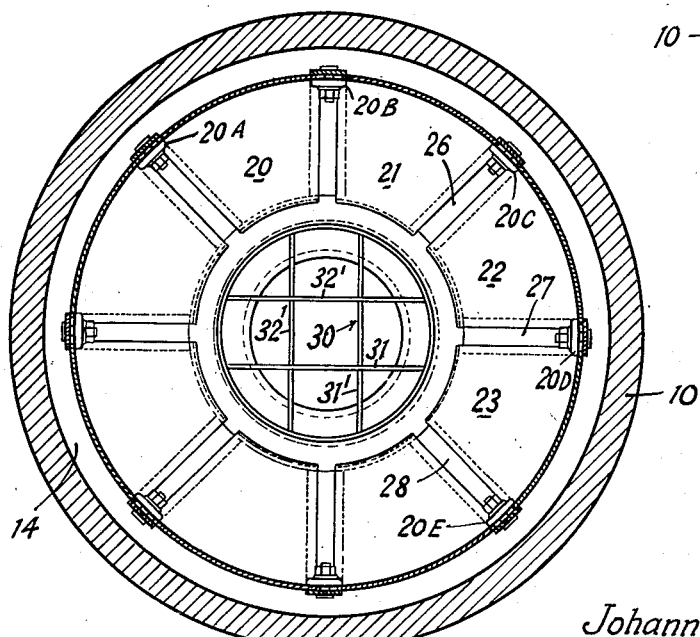

Patented Oct. 6, 1953

2,654,351

UNITED STATES PATENT OFFICE 2,654,351

FLUID SEPARATOR

Johannes H. Ammon, Akron, Ohio, assignor to The Babcock & Wilcox Company, New York, N. Y., a corporation of New Jersey Application February 1, 1949, Serial No. 73,985

2 Claims. (Cl. 122—459)

This invention relates to improvements in a vapor generator incorporating a fluid separator, and particularly a separator for fluids of different densities.

The invention is embodied in a steam generator having apparatus for separating steam and water, such apparatus being particularly adapted for coaxial use with a steam and water drum of such a steam generator as that described in the copending Kessler application, Ser. No. 73,974, filed February 1, 1949, now Patent No. 2,567,696.

The illustrative steam generator includes a separator disposed within the steam and water drum and so associated therewith as to provide effective water and steam separation at high capacities the separator operates on the centrifugal principle, with steam and water mixtures being caused to flow in such a manner into a separating chamber that a whirling motion of the fluid is set up within that chamber to have a centrifugal effect in the separation of the fluids. In the particular example of the invention described herein, mixtures of steam and water are directed generally tangentially into the whirl chamber at high velocity. In this chamber the steam is separated from the water by the centrifugal action of the resulting vortex in the whirl chamber, and the steam passes from the chamber through an upper outlet, then through an auxiliary separator, and thence from the pressure vessel and to a position of further treatment, or use. The separated water is discharged through another outlet disposed at the bottom of the whirl chamber.

One of the objects of the invention is to so completely separate a gas or vapor from a liquid that subsequent treatment or use of the gas shall not suffer because of the presence of any liquid therein. This also involves the effect whereby the separated liquid will not be subject to the presence of gases therein.

Another object of the invention is to provide a high capacity vertically elongated steam and water drum of a steam generator, the drum being provided with a central whirl chamber having a plurality of circumferentially distributed inlets to set up an effective cyclonic separating action within the whirl chamber.

Another object is to so construct the drum and the whirl chamber that the drum internals may be inserted in and removed through a manhole in the drum, this construction permitting access to associated steam generating tubes for maintenance.

A preferred embodiment of the invention is shown in the accompanying drawings and other objects of the invention will be described as the following description proceeds.

In the drawings:

Fig. 2 is a vertical section;

Fig. 3 is a horizontal transverse section on line 3—3 of Fig. 2;

Fig. 4 is mainly a horizontal section taken on the section line 4—4 of Fig. 2;

Fig. 5 is a horizontal section on the plane indicated by line 5—5 of Fig. 2;

Fig. 6 is a horizontal section on the line 6—6 of Fig. 2; and

Fig. 7 is a detail view in vertical section, on the line 7—7 of Fig. 4, showing the construction forming one of the steam and water inlets to the whirl chamber.

Figure 1:
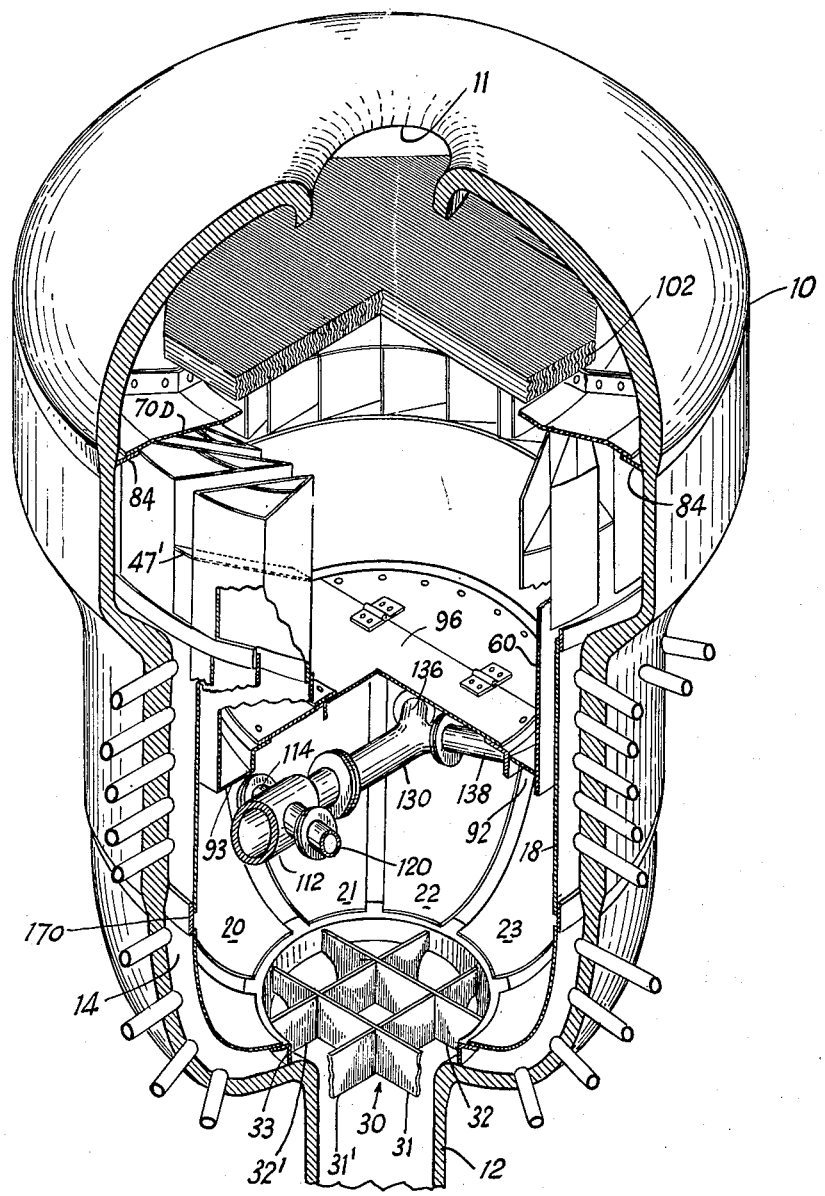
Fig. 1 is a cutaway isometric view showing the illustrative vapor generator.

The drawings show a vapor generator including a pressure vessel 10 constituting a steam and water drum having its major axis disposed vertically. This pressure vessel is disposed at the top of a large diameter co-axial downcomer 12, and the annular space 14 immediately within the pressure vessel 10 receives a multiplicity of streams of steam and water mixtures from the bank of steam generating tubes 16. This bank of tubes is disposed as indicated in the above mentioned copending Kessler patent application so as to be subject to the high temperature gases from a combustion chamber within the installation.

The interior wall defining the annular inlet chamber or space 14 is formed by an annular cylindrical shell 18 made up of sections such as 18A—18H detachably joined by C-clamps such as 18K—18R.

The lower end of shell 18 is in communication with the downcomer 12 through an extension of the shell 18, which is shown as involving segmental plates of spherical configuration, such as 20, 21, 22, and 23. These plates are detachably connected as by C-clamps, such as 20A—20E, similar to 18K—18R, to fixed members such as 26—28 to form a closure and a complete inner wall of the lower part of the annular space 14 which constitutes the steam and water inlet chamber. The lower end of the separator construction also involves a vortex inhibitor 30 including the upright intersecting plates 31, 32, 31′ and 32′ and an upper ring 33 closely engaging the plates 20—23 and other associated members at the positions shown in the drawing.

These parts, as well as the others, within the drum 10 are segmentally constructed and arranged to permit their insertion and removal through the manhole 11 at the top of the drum for both original construction, and maintenance. For this purpose, the C-clamps for securing the segments of shell 18 and its extension are accessible from the lower central part of the drum after the superimposed parts have been removed.

Mixtures of steam and water at high pressures enter the annular inlet chamber 14 from the steam generating tubes. These positions of entry are below the normal water level 35. From the upper part of the inlet chamber 14, the steam and water flows through such inlet passages as 40—51. These passages are substantially tangentially disposed with reference to the whirl chamber formed by the inner shell 60. The arrangement of these passages with reference to the whirl chamber in the shell 60 is particularly shown in Fig. 4, the upright walls of the inlet passages being formed by composite similar hollow tubular constructions such as 70—81, which may be considered as guide vane units. Each of these constructions is tapered outwardly as indicated in Fig. 4, and they are secured in their operative positions by attachment to the pressure vessel as indicated at 84. Each guide vane unit such as 70 consists of two complementary hollow metallic components such as 70A and 70B (Figs. 4 and 7) and the adjoining passage, such as 40 (Fig. 4) is downwardly directed by the partition plate 70C (Fig. 7), the top cover plate 70D, and the bottom plate 70E. In Fig. 1, a similarly disposed partition plate is shown at 47'. In Fig. 7 the metallic components 70B and 70A are shown as having cooperating flanges 70F, 70G, 70H, and 70K, which are bolted together to form the composite guide vane unit 70. The units 71—81 are similarly constructed and they are held in fixed operative position by securement of the plate 70D to the ring 84, and by securement at other positions such as 86, 88, and 90. The ring 84 co-acts with the cover plate (or plates) 70D to seal the drum wall to the guide vanes 70—81 and prevent any steam and water mixture from passing from the inlet chamber 14 to the separated steam space above the whirl chamber.

The passages 40—51 direct streams of steam and water mixtures inwardly at such velocity that that an effective centrifugal separating action is set up within the whirl chamber, the heavier fluid, such as water, being impelled toward the wall of the shell 60 from which position it discharges from the lower end of the whirl chamber through the annular passage indicated at 92. In this passage there are a plurality of downwardly inclined vanes 93, circumferentially spaced, and overlapping as shown at 92' and 94'. These vanes separate the passage 92 into eight openings, in annular arrangement. The bottom of the whirl chamber is otherwise closed by the plate construction including a central movable access plate 96 hinged at one side as clearly indicated in Fig. 1. The separated water discharged downwardly through the openings in the annular passage 92 passes through the lower part of the shell 18, and its lower extension, to the downcomer 12, and thence to a drum or other pressure vessel construction disposed at the bottom of the downcomer and connected to the lower or inlet ends of the steam generating tubes as indicated in the Kessler patent application, above referred to.

In the action of the separator the steam collects centrally of the whirl chamber shell 60, and, from this position, it flows upwardly through the outlet 100 of the whirl chamber and between the upright and horizontally spaced corrugated plates of the auxiliary separator 102. From the space above this auxiliary separator the steam is conducted by appropriate connections to a point of further treatment, or use.

In the particular installation shown in the drawings the steam emerging from the auxiliary separator 102 is conducted to a superheater including a bank of upright tubes 104. This superheater is disposed within an annular space similar to that in which the bank of steam generating tubes of bank 160 is disposed, and it is heated by gases from a combustion chamber disposed as indicated in the copending Kessler application.

The inlet ends of the superheater tubes are connected to a substantially radially extending superheater header 110 which receives steam from a unitary tubular connection 112 extending through the wall of the pressure vessel 10, as indicated in Figs. 2 and 3. As particularly shown in the latter figure, the inner end of the tubular extension 112 has lateral connections 114 and 116 which are connected by the tubular parts 118 and 120 to the lower ends of upright tubular members 122 and 124. The latter are of substantially the same triangular cross-section as the other guide vane components, such as 70B but they are longer than such components. For example, the tubular member 122, connected to the tubular element 120, extends upwardly through and past the top plate 70D into the drum steam space. They also extend downwardly between the shell 18 and the whirl chamber shell 60 to positions at a level below the access plate 96. Similarly, the tubular element 124 of the guide vane or hollow construction 80, extends from the element 118 below the whirl chamber upwardly to a position within the steam space above the auxiliary separator 102. This is indicated particularly in Fig. 2 of the drawings.

The tubular extension 112 has connected thereto a conduit component such as 130, as indicated in Fig. 3. Additional tubular components 136 and 138 extend across the water space beneath the bottom of the whirl chamber to triangular conduits 140 and 142, which are constructed and disposed in a manner similar to the tubular elements or conduits 122—124. These conduits 140 and 142 extend upwardly so as to have their inlet ends in communication with the steam space of the pressure vessel 10, above the auxiliary separator 102.

The steam flows from the superheater inlet header 110 through the tubes of the bank 104 to a superheated outlet header 151, and thence through the conduit 152, to a point of use.

The steam generating tubes, the furnace (or furnaces), and the superheater tubes are enclosed within a cylindrical metallic shell 150 having a pressure tight connection 150' at its upper end to the steam and water chamber 10 and a similar connection to a lower water chamber. This permits the operation of the furnace at high gas pressures.

With the construction shown and described above, the saturated steam connections extend downwardly in the drum from the steam space above the whirl chamber to positions below the vaned water discharge from the whirl chamber without substantial sacrifice of effective drum space, and the superheater manifold 112 and the adjacent conduits connected thereto are disposed at an elevation where they may be advantageously directly connected to the superheater header 110 without extending through the outside pressure casing 150. Thus, differential expansion movements between the steam and water drum and the superheater inlet header are avoided.

The described construction presents a vapor and liquid separator combined with a steam and water drum in such a manner that advantageously short connections to the superheater are presented.

While in accordance with the provisions of the statutes I have illustrated and described herein the best form of my invention now known to me, those skilled in the art will understand that changes may be made in the form of the apparatus disclosed without departing from the spirit of the invention covered by my claims, and that certain features of my invention may sometimes be used to advantage without a corresponding use of other features.

What is claimed is:

1. In a steam generator, a vertically elongated cylindrical steam and water drum, a whirl chamber steam and water construction disposed coaxially within the drum with the whirl chamber wall spaced radially from the drum wall to provide an annular chamber throughout the height of the whirl chamber for incoming steam and water mixtures, said annular chamber being closed at its lower end within the drum, an inlet construction presenting a plurality of circumferentially distributed substantially tangential whirl chamber inlets communicating with said annular chamber and the whirl chamber, means forming a separated steam space above the whirl chamber and within the drum, means forming an outlet for separated water near the bottom of the whirl chamber, downcomer means connected to the separated water outlet, a cylindrical pressure tight combustion chamber casing presenting combustion space in an annular zone around the downcomer means, steam generating tubes subject to the heat of combustion gases in said zone and having their upper ends directly communicating with said annular steam and water mixture chamber, a superheater having tubes subject to the heat of combustion gases in the space between the downcomer means and the casing and having an inlet header alongside said drum at a level near the whirl chamber bottom, and tubular means conducting steam from said steam space to the superheater inlet header, said tubular means extending downwardly within the drum to a position adjacent the superheater header.

2. In a vapor and liquid separator, pressure vessel means forming a liquid and vapor chamber, a whirl chamber construction disposed within the liquid and vapor chamber so as to leave an annular inlet space between the whirl chamber and the liquid and vapor chamber, whirl chamber inlet constructions presenting a plurality of circumferentially distributed whirl chamber inlets for the substantially tangential flow of a liquid and vapor mixture into the whirl chamber from said space, means forming a separated vapor space above the whirl chamber and within the liquid and vapor chamber, a large diameter downcomer integral with the pressure vessel means and extending downwardly therefrom, a circular whirl chamber bottom of lesser diameter than the whirl chamber and spaced from the whirl chamber wall to provide for the outlet of separated liquid in an annular perimetrical zone adjacent the whirl chamber bottom, a vortex inhibitor between the outlet of the whirl chamber and the inlet of the downcomer, tubular connections disposed beneath the whirl chamber and having a part extending outwardly through the pressure vessel wall for conducting separated vapor to a position of further treatment, and upright tubular means within the pressure vessel and directly connecting the separated vapor space and said first mentioned tubular connections.

JOHANNES H. AMMON.

References Cited in the file of this patent

UNITED STATES PATENTS

| Number | Name | Date |
|---|---|---|
| 1,238,829 | Schneible | Sept. 4, 1917 |
| 1,568,413 | Peebles | Jan. 5, 1926 |
| 1,662,841 | Woodward | Mar. 20, 1928 |
| 1,674,945 | Boyrie | June 26, 1928 |
| 1,684,022 | Hawley | Sept. 11, 1928 |
| 1,753,972 | Schutz | Apr. 8, 1930 |
| 1,917,606 | Sillers | July 11, 1933 |
| 2,106,589 | Bigger et al. | Jan. 25, 1938 |
| 2,112,321 | Wood | Mar. 29, 1938 |
| 2,518,459 | Frisch | Aug. 15, 1950 |